United States Patent [19]

Aono

[11] 3,998,297
[45] Dec. 21, 1976

[54] BRAKE SHOE CLEARANCE AUTOMATIC ADJUSTING DEVICE

[75] Inventor: Masami Aono, Yokohama, Japan
[73] Assignee: Tokico Ltd., Kawasaki, Japan
[22] Filed: Apr. 12, 1976
[21] Appl. No.: 675,895

[30] Foreign Application Priority Data
Apr. 10, 1975 Japan .................. 50-48663[U]

[52] U.S. Cl. .................. 188/79.5 GT; 188/196 B
[51] Int. Cl.² .................. F16D 65/58
[58] Field of Search .................. 188/79.5 B, 79.5 P, 188/79.5 GT, 196 B, 196 BA

[56] References Cited
UNITED STATES PATENTS 3,811,537  5/1974  Margetts .................. 188/79.5 P
3,874,481  4/1975  Margetts .................. 188/79.5 GT Primary Examiner—Duane A. Reger
Attorney, Agent, or Firm—Wenderoth, Lind & Ponack

[57] ABSTRACT

In a brake shoe clearance automatic adjusting device comprising a strut member disposed between a pair of arcuate shoes and having a generally L-shaped ratchet member pivotally mounted on one end thereof, one end of the ratchet member being operably connected to one shoe with a clearance, the other end of the strut member being operably connected to the other shoe, and a pawl member pivotally mounted on the strut member for engaging with ratchet teeth formed on the ratchet member, wherein the improvement comprises a plate spring extending between and mounted on two pivotal shafts relating respectively to the ratchet member and the pawl member, and a lug portion formed on the plate spring for resiliently biassing the pawl member towards the ratchet teeth.

6 Claims, 4 Drawing Figures

BRAKE SHOE CLEARANCE AUTOMATIC ADJUSTING DEVICE

This invention relates to a brake shoe clearance automatic adjusting device in a shoe drum brake for use in a vehicle such as an automobile or the like.

Various brake shoe clearance automatic adjusting devices have been proposed to compensate variation in stroke of a brake lever or a brake pedal caused by wear of linings in the shoe drum brake. One of the devices comprises a strut member disposed between a pair of arcuate shoes and having a generally L-shaped ratchet member pivotally mounted on one end of the strut member, one end of the ratchet member being operably connected to one shoe with a clearance, the other end of the strut member being operably connected to the other shoe, and a pawl member pivotally mounted on the strut for cooperating with ratchet teeth formed on the ratchet member to restrict the rotation of the ratchet member on the strut member in one direction.

In the brake shoe clearance automatic adjusting device of the aforementioned type, it is required to mount the ratchet member and the pawl member on the strut member suitably and easily with respect to the respective pivotal shafts and to prevent lateral misalignment and/or excessive play which might cause due to manufacturing tolerance or wear of the pivotal shafts and the associated members.

An object of the present invention is to provide a brake shoe clearance automatic adjusting device of the aforementioned type being simple in construction, easy to assemble and stable in operation.

The brake shoe clearance automatic adjusting device according to the present invention comprises a strut member disposed between a pair of arcuate shoes and having a generally L-shaped ratchet member pivotally mounted on one end of the strut member, a projecting portion formed on one end of the ratchet member for projecting into an opening formed in a web of one of the shoes with a clearance, the other end of the strut member being operably connected with the other shoe, ratchet teeth formed on the other end of the ratchet member, and a pawl member pivotally mounted on the strut member for meshingly engaging with the ratchet teeth, the improvement comprises a plate spring extending between and mounted on two pivotal shafts relating respectively to the ratchet member and the pawl member, and a lug portion formed on the plate spring for resiliently biassing the pawl member in the direction engaging with the ratchet teeth.

Other objects and novel features of the present invention will become apparent from the following description in connection with the accompanying drawings, in which.

Figure 1:
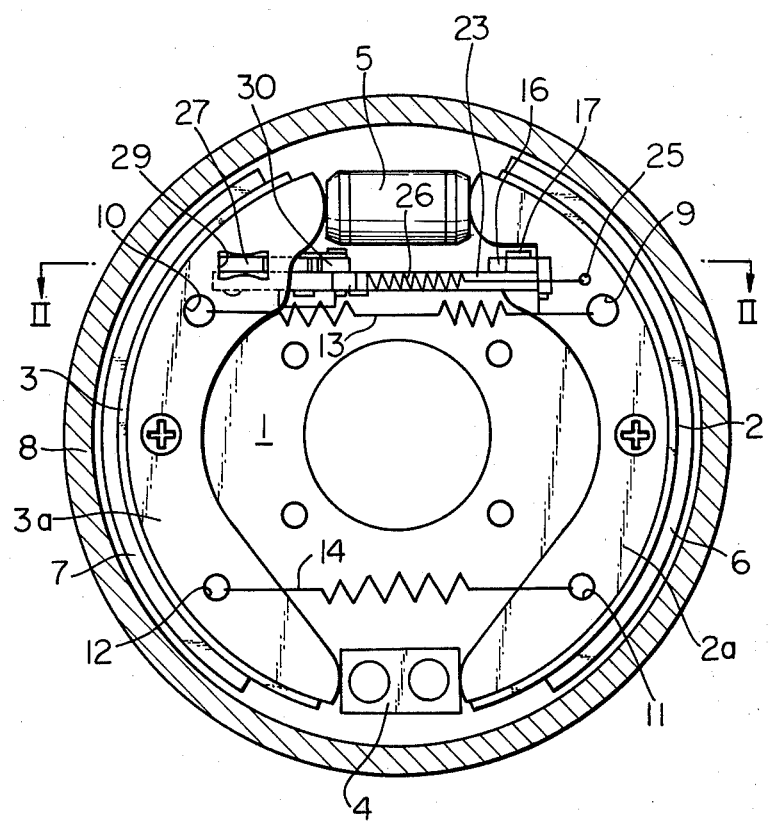
FIG. 1 is a front view of a drum brake incorporating a brake shoe clearance automatic adjusting device exemplifying the present invention.

FIG. 1 is a front view illustrating essential part of a shoe drum brake incorporating a brake shoe clearance automatic adjusting device according to the present invention. The shoe drum brake comprises a back plate 1 secured to a non-rotatable part of the vehicle. Two brake shoes 2 and 3 are mounted on the back plate 1, and the lower ends of the brake shoes abut respectively with an anchor 4 secured to the back plate 1, and the upper ends thereof abut with a wheel cylinder 5 respectively. Linings 6 and 7 are respectively bonded to the brake shoes 2 and 3 for contacting with the inside surface of a drum 8 rotatable with a wheel (not shown).

Each of webs 2a and 3a of the brake shoes 2 and 3 are provided with two openings 9, 10 and 11, 12 respectively, and two return springs 13 and 14 extend between the openings to urge the shoes 2 and 3 towards with each other.

A strut assembly including a strut member 23 is disposed between the shoes 2 and 3 and adjacent to the wheel cylinder 5 for effecting brake shoe clearance adjusting function and hand brake applying function.

The details of the strut assembly will be explained with reference to FIG. 2.

The drum 8 is disposed adjacent to the circumference of the back plate 1 and, provided inwardly of the drum 8 with the shoes 2 and 3 to which the friction linings 6 and 7 are bonded opposing to the drum 8. The shoes 2 and 3 are movable laterally or leftwards and rightwards in FIG. 2 and, are adapted to effect braking function in response to actuation of the wheel cylinder 5 (not shown in FIG. 2).

An opening 1a is formed at a suitable position of the back plate 1 for receiving a portion of a generally L-shaped hand brake lever 16 which is pivotally connected by means of a pin 17 to the strut member 23. An end portion 16a of the hand brake lever 16 abuts against the inside edge of a web 2a of the shoe 2.

A stopper 18 is secured to the hand brake lever 16 by means of a pin 19 at a suitable position in a portion of the hand brake lever which projects outside from the back plate 1 to restrict the movement of the hand brake lever 16 in the counterclockwise direction.

A cover plate 20 is secured to the back plate 1 for cooperating with the drum 8 in preventing ingress of water, dust or the like into the inside of the brake. A dust cover 21 covers the opening 1a of the back plate 1.

Figure 2:
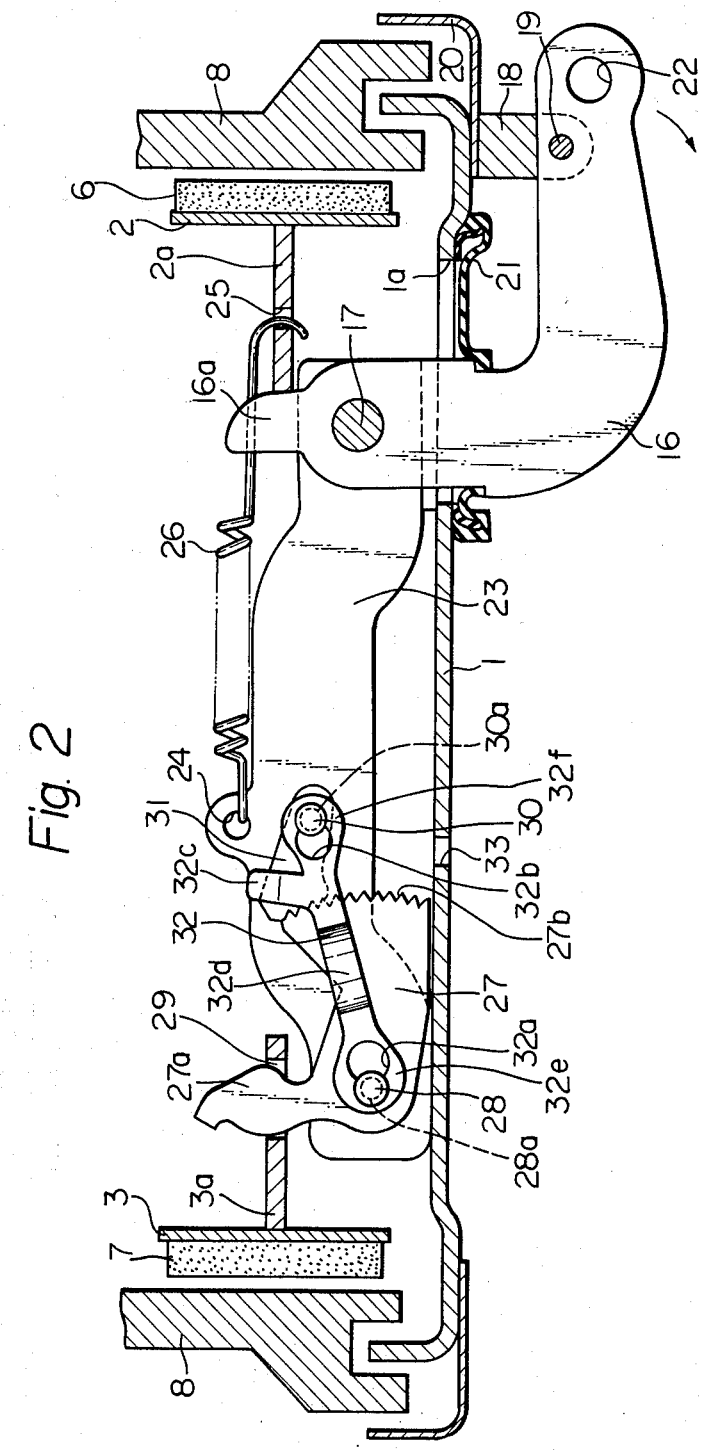
FIG. 2 is a cross-sectional view taken along line II—II in FIG. 1.

A hole 21 is formed in the rightside such portion of the hand brake lever 16 as shown in FIG. 2, and, one end of a cable (not shown) is connected thereto for pulling the hand brake lever 16 in the arrow direction.

Thus, when the cable is pulled the hand brake lever 16 rotates around the pin 17 pivotally connecting the lever 16 with the strut member 23 and moves the strut member 23 along the back plate 1.

An opening 24 is bored through the strut member 23 at generally central upperside portion thereof for connecting one end of a tension spring 26, the other end of which engages with a hole 25 formed in the web 2a of the shoe 2, whereby the end portion 16a of the hand brake lever 16 is urged against the inside edge of the web 2a of the shoe 2.

A generally L-shaped ratchet member 27 is pivotally mounted by a pivotal shaft 28 on one end (the leftside end in FIG. 2) of the strut member 23. One arm or projecting portion 27a of the ratchet member 27 is fitted in an opening 29 formed in a web 3a of the shoe 3 with a predetermined amount of clearance. Ratchet teeth 27b are formed in the other arm or end portion of the ratchet member 27 for meshing with a pawl member 31 which is pivotally mounted by a pivotal shaft 30 on generally central portion of the strut member 23 and acts to prevent the rotation of the ratchet member 27 in the clockwise direction.

Figure 3:
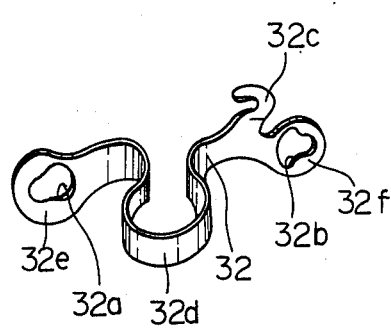
FIG. 3 is a perspective view showing a plate spring incorporated in the drum brake of FIG. 1.
Figure 4:
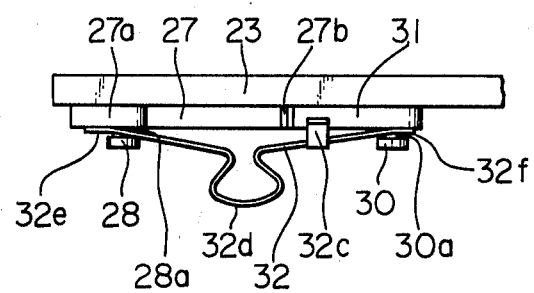
FIG. 4 is a plan view showing a strut member, a pawl member and the plate spring incorporated in the drum brake of FIG. 1 in the assembled condition.

A plate spring 32 having generally pear-shaped openings 32a and 32b at the opposite ends thereof as shown in FIG. 3 is mounted on the pivotal shafts 28 and 30 with the openings 32a and 32b engaging respectively the grooves 28a and 30a formed in the pivotal shafts 28 and 30. The pear-shaped openings 32a and 32b are arranged such that the smaller area portion of each of the openings is located outside. The plate spring 32 has a central curved portion 32d which acts to urge the opposite end portions towards with each other resiliently, thus, the smaller area portions of the pear-shaped openings 32a and 32b are urged to engage with the grooves 28a and 30a for supporting the plate spring 32 on the pivotal shafts 28 and 30, whereby the ratchet member 27 and the pawl member 31 are retained on the pivotal shafts 28 and 30 respectively. It will be noted that the shafts 28 and 30 have head portions (not shown) and stems and are inserted downwardly in FIG. 4 through aligned bores formed respectively in the strut member 23 and the ratchet member 27 and the pawl member 31 with the ends of the stems projecting downwardly in FIG. 4 from the ratchet member and the pawl member respectively, and having annular grooves 28a and 30a formed therein. The larger area portions of the pear-shaped openings 32a and 32b are larger than the cross-section of the stems of the pivotal shafts 28 and 30 for allowing mounting operation. Further, as shown in FIG. 4, the plate spring 32 takes a form of a hat-like shape having a curved central portion and inclined end portions. The opposite end portions 32e and 32f are resiliently deformed transversely to the plane of the plate spring, thus urging the ratchet member 27 and the pawl member 31 against the strut member 23 and preventing misalignment of the meshing engagement between the ratchet teeth and the pawl in the direction of the axes of the shafts 28 and 30, whereby reliable meshing engagement is attained between the ratchet member 27 and the pawl member 31. Further, a lug portion 32c is formed on the spring plate 32 at a position adjacent to the pear-shaped opening 32b, and acts on the pawl member 31 to resiliently bias the pawl member 31 in the direction engaging the ratchet teeth 27b of the ratchet member 27 or downwardly in FIG. 2.

A hole 32 is formed in the back plate 1 for allowing insertion of a driver or the like from the outside in releasing the meshing engagement between the pawl member 31 and the ratchet teeth 27b of the ratchet member 27 mannually.

According to the device constructed as heretofore described, when a driver actuates the brake, the two shoes 2 and 3 expand in the rightward and leftward directions in FIG. 2 urging the linings 6 and 7 against the inside periphery of the drum 8 to effect braking function. At this moment the ratchet member 27 does not rotate thus having no effect on the brake shoe clearance adjusting function as long as the linings have not been worn away and the amount corresponding to relative displacement between the shoes 2 and 3 position of the opening 29 is less than the clearance between the opening 29 in the web 3a of the shoe 3 and the projecting portion 27a of the ratchet member 27.

When wear of the linings 6 and 7 increases and the amount corresponding to relative movement between the shoes in applying brake at the position of the opening 29 exceeds the clearance, the inside edge of the opening 29 in the web 3a of the shoe 3 abuts against one side edge (rightside edge in the drawing) of the projecting portion 27a of the ratchet member 27 and rotates the ratchet member 27 in the counter-clockwise direction in response to the leftward movement of the shoe 3 since the strut member 23 is urged towards the shoe 2 by means of the spring 26.

The ratchet teeth 27b formed in the ratchet member 27 meshingly engage with the pawl member 31 which in turn is urged resiliently in the counter-clockwise direction by means of the lug portion 32c of the plate spring 32, thus, the ratchet member 27 rotates by a unit of one tooth when the meshing engagement slips off by an amount of one tooth during the counter-clockwise rotation of the ratchet member 27. When the driver releases the brake, hydraulic pressure in the wheel cylinder 5 decreases and the shoes 2 and 3 return towards each other by means of the return springs 13 and 14 to positions which are determined by engagement of the inside edge of the opening 29 in the web 3a of the shoe 3 with the other side (the leftside in the drawing) of the projecting portion 27a of the ratchet member 27. In this connection, this position is such a position as would be determined by the amount of wear of the linings 6 and 7 (exactly stated, determined by number of teeth of the ratchet teeth 27b approximately corresponding to the aforementioned amount), as compared with the position attained when the linings 6 and 7 have not been worn away. Consequently, an undesirable clearance which will be produced between the linings 6 and 7 and the inner periphery of the drum 8 due to wear of the linings can automatically be compensated to zero.

Although one end of the strut member 23 in the embodiment abuts with the shoe 2 through the hand brake lever 16, but the strut member 23 may directly engage with the shoe 2 and act independently from a hand brake actuating mechanism.

The brake shoe clearance automatic adjusting device according to the present invention as described hereinbefore, comprises a single plate spring having two functions for retaining the ratchet member and the pawl member on the strut member around respective pivotal shafts and urging the pawl member meshingly engaging with the ratchet teeth of the ratchet member, thus, the number of the parts can be reduced, the construction of the brake can be simplified, and assembling operation can easily be performed. Further, since the plate spring acts to urge the ratchet member and the pawl member towards the strut member, reliable meshing engagement can be obtained between the ratchet member and the pawl member, and stable operational characteristics will be obtained in adjusting the brake clearance.

What is claimed is:
1. A brake shoe clearance automatic adjusting device of a shoe drum brake comprising a strut member disposed between a pair of arcuate shoes and having a generally L-shaped ratchet member pivotally mounted on one end thereof, a projecting portion formed on one end of said ratchet member for projecting into an opening formed in a web of one of the shoes with a clearance, the other end of the strut member being operably connected with the other shoe, ratchet teeth formed on the other end of the ratchet member, a pawl member pivotally mounted on the strut member for meshingly engaging with the ratchet teeth, said meshing engagement between the pawl member and the ratchet teeth will slip off when the projecting portion of the ratchet member moves with said one shoe towards the drum, a plate spring extending between and mounted on two pivotal shafts relating respectively to said ratchet member and said pawl member, and a lug portion formed on the plate spring for resiliently biassing the pawl member in the direction engaging with the ratchet teeth.

2. A brake shoe clearance automatic adjusting device according to claim 1, wherein said pivotal shafts have stems extending through aligned bores formed in the strut member and the ratchet member and the pawl member respectively and projecting from the ratchet member and the pawl member respectively, and said plate spring is mounted on the respective projecting end of the pivotal shafts.

3. A brake shoe clearance automatic adjusting device according to claim 2, wherein an annular groove is formed in each of the projecting ends of the stems of said pivotal shafts for engaging with said plate spring.

4. A brake shoe clearance automatic adjusting device according to claim 3, wherein a generally pear-shaped opening is formed in the opposite ends of the plate spring, the larger area portion of which is larger than the cross-section of the stem of corresponding pivotal shafts and the smaller area portion of which is adapted to engage with said annular groove.

5. A brake shoe clearance automatic adjusting device according to claim 1, wherein the plate spring has a form of hat-like shape having a curved central portion and inclined end portions, said curved central portion acts to resiliently bias the end portions towards with each other, said inclined end portions act to afford resilient force in the directions of the axes of the pivotal shafts.

6. A brake shoe clearance automatic adjusting device according to claim 1, wherein, the lug portion of the plate spring extends in the direction parallel to the axis of the pivotal shaft of the pawl member to engage and resiliently bias the pawl member.

* * * * *